Figure 1:
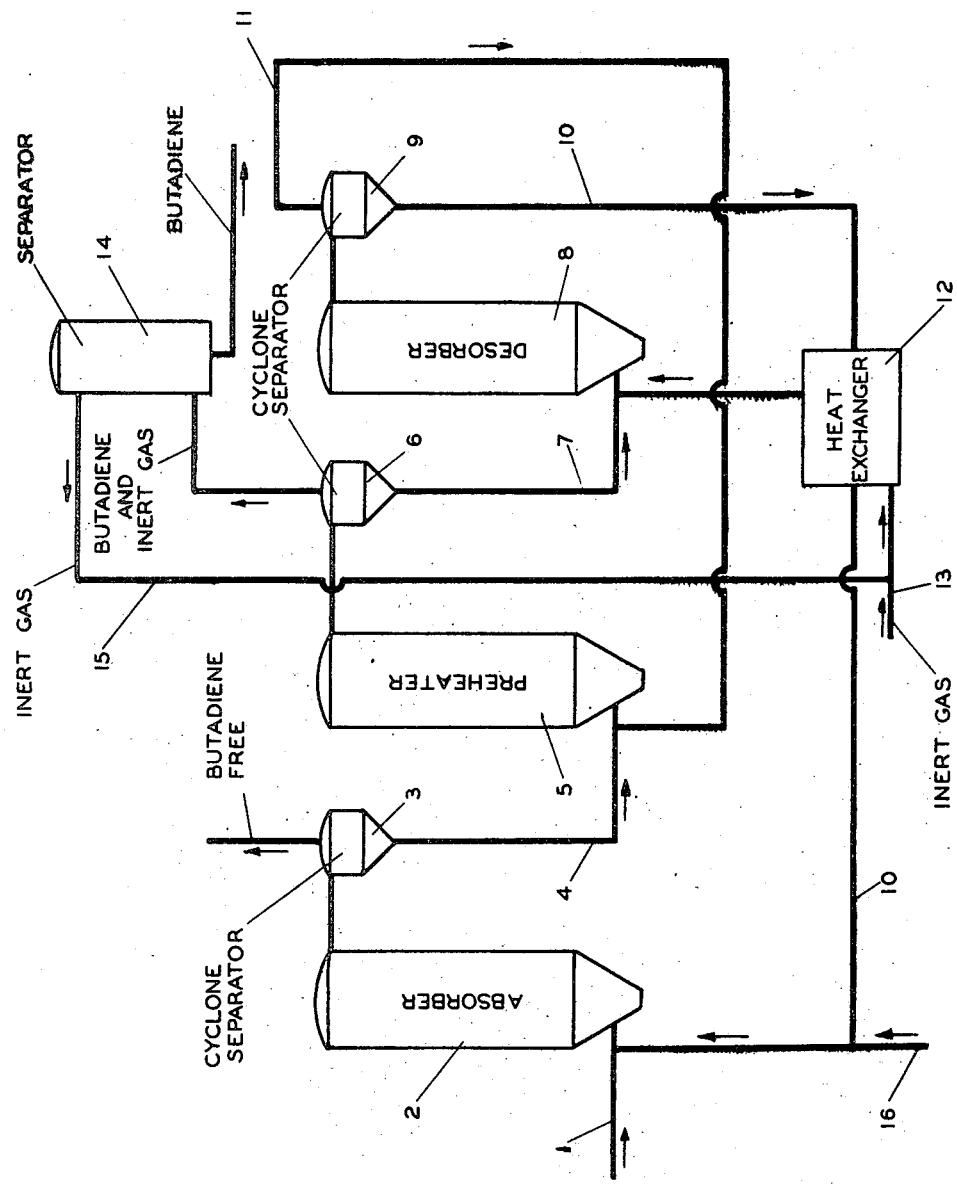

Patented Oct. 9, 1945

2,386,734

UNITED STATES PATENT OFFICE 2,386,734

METHOD FOR RECOVERY OF DIOLEFINS

I. Louis Wolk, Bartlesville, Okla., assignor to Phillips Petroleum Company, a corporation of Delaware Application March 8, 1943, Serial No. 478,427

4 Claims. (Cl. 260—681.5)

The present invention relates to a method for the separation of conjugated diolefins from mixtures containing the same by reaction with complex-forming salts. More specifically, it relates to a method for utilizing cuprous halide reagent in finely divided form so that reaction to form the complex and decomposition to liberate the diolefin may be effected essentially in a vapor state.

Cuprous halides combine with unsaturated hydrocarbons by a thermally-reversible reaction to form complex addition compounds. The reaction of cuprous chloride with butadiene may be represented by this equation:

This complex compound is relatively stable under ordinary conditions of temperature and pressure, whereas the corresponding butylene-cuprous chloride addition compounds are much less stable under the aforesaid temperature and pressure conditions. Thus, formation of the butadiene complex affords a method of separating butadiene from accompanying olefins and paraffins, particularly when conditions are chosen so as to minimize olefin complex formation and/or physical retention of contaminants in the reaction zone.

It has been disclosed in co-pending applications, such as Serial No. 354,086 filed August 24, 1940, of Schulze, Hillyer, and Drennan, and Serial No. 408,372 filed August 26, 1941, of Schulze and Short, that dry solid cuprous chloride supported on various types of carriers may be effectively utilized for the absorption and recovery of butadiene by complex formation. In these processes, gaseous feed mixtures containing butadiene may be treated by flow through elongated beds of the contact material at space velocities corresponding, for example, to 0.2 to 0.5 liquid volume per hour of feed per volume of reagent, where a major proportion of the reagent comprises cuprous chloride. The complex is formed at a satisfactory rate at temperatures of about 35–50° F. while decomposition of the complex occurs rapidly at temperatures of about 175° F. or above. Such methods utilize the reagent in the form of granular beds and the like in contrast to the essentially gaseous type of operation disclosed herein. This type of procedure possesses definite advantages due to efficient contact, conservation of heat and shorter contact times permitting greater volume production with given quantities of reagent.

In accordance with the present invention the reactants are contacted with finely divided reagent suspended therein for a sufficient length of time to permit complex formation on the one hand in one stage of the process and decomposition of complex in another stage while the reagent is in a suspended state thereby effecting reaction and decomposition under optimum conditions of contact and heat exchange. In one form of the invention described below, finely divided reagent particles which may be a cuprous halide such as chloride or bromide, or other complex-forming inorganic metal salt of a heavy metal of group I or II of the periodic system, are carried through absorption, heat exchange and decomposition zones in suspension in a stream of gaseous diolefin-containing feed at temperatures at which complex formation will take place. Preferably the reagent particles may range from about 20 to about 200 microns in size and particles of about 100–400 mesh are suitable. The feed is passed through the zones at a velocity sufficient to maintain the particles in suspension and at a rate which will give the desired contact time. In vertical chambers a gas velocity of 1–10 feet per second may be suitable, the lower velocities being utilized for the more finely divided reagent and the higher velocities for heavier particles. The use of more finely divided particles will permit shorter contact times and shorter absorption zones, while larger particles and greater gas velocities will require somewhat longer contact time and more elongated absorption zones or recycle of suspension. Similar velocities may be provided in the desorption and heat exchange zones hereinafter described.

In order to ensure substantially complete absorption of diolefin a ratio of reagent to diolefin is preferably provided in the suspension in which the reagent is present in excess of the stoichiometric amount required for the reaction. For example, two mols of cuprous chloride are required to combine with each mol of butadiene, in other words the gas should contain in suspension approximately at least four times as much cuprous chloride as butadiene by weight. Preferably the excess of cuprous chloride should not be too great since this would require handling of excessive quantities of reagent. Ordinarily from one to two times the stoichiometric equivalent of cuprous halide is sufficient. A contact time ranging from 10 to 100 seconds is generally adequate to provide substantial absorption of diolefin under the conditions described above.

In operating the present method, reference may be had to a form of apparatus described in Figure 1.

Cuprous chloride of 100–400 mesh in line 10 is admixed with gaseous feed in line 1 containing 10 per cent or more butadiene in admixture with other C₄ hydrocarbons; the stream of hydrocarbon and reagent suspended therein flows through absorbing zone 2 at a flow rate sufficient to permit substantially complete reaction between the butadiene and CuCl in accordance with the following reaction:

$$C_4H_6 + 2CuCl \rightleftharpoons C_4H_6 \cdot 2CuCl$$

This reaction preferably is carried out at temperatures between about 35–50° F. The gas stream containing complex, and C₄ hydrocarbons other than butadiene with some unreacted material, is introduced into cyclone separator 3, the butadiene-free gas escaping while the solid complex is deposited and flows by gravity or by conveyor means through line 4 to zone 5 where it is met by a stream of hot butadiene and inert gas from decomposition zone 8 as hereinafter described. The complex becomes suspended in this gas stream and is raised to a more elevated temperature, that is, the gas stream may be at about 175° F. while the complex may be at 50° F. The resulting temperature of the complex may be about 100° F. when it leaves zone 5 while the temperature of the gas stream will also be about 100° F. The suspension is introduced into cyclone separator 6 and the solid complex deposited out, the gas stream containing inert gas and butadiene passing to separator 14 where butadiene is recovered by condensation or solvent extraction, the cool inert gas being utilized as hereinafter described. Any particles which may deposit in zones 2, 5, or 8 may be removed from the bottom of said zones by means not shown.

The preheated complex flows through line 7 by gravity or mechanical means into decomposing zone 8 at the entrance to which it meets the stream of inert gas from separator 14, which has previously been preheated either by heat exchange with gaseous effluent from cyclone separator 9, or by contact with hot cuprous chloride separated in 9 by direct heat exchange therewith or by some other heat exchange means. The complex is heated in zone 8 to decomposition temperatures of from 175 to 250° F. by heating coils in said zone or by first preheating the inert gas to the desired temperature. Cuprous chloride is recovered in cyclone separator 9 while the mixture of butadiene and inert gas is used to preheat cold complex in 5 as described above. The cuprous chloride is reintroduced into absorption or reaction zone 2 after cooling to absorption temperature in heat exchanger 12 where the cold inert gas from separator 14 may be used as a direct or indirect heat exchange medium. If it is desired to separate the butadiene from the inert gas stream leaving separator 9 as soon as possible, this stream may be cooled to separate butadiene, after which the inert gas may be preheated by contact with hot desorbed cuprous chloride from 9 in indirect or direct heat exchange as by suspending the cuprous chloride therein followed by separation, this preheated inert gas may then be used for preheating the cold complex in 5 in place of the butadiene-inert gas mixture. In this modification cyclone separator 6 may be by-passed, the suspension going directly into desorber 8 where desorption temperatures are provided. This will obviate the necessity for handling the butadiene under conditions in which polymerization might occur and represents an alternate procedure.

As inert gas, low-boiling relatively incondensible hydrocarbons such as methane, ethane, or propane may be used, or inert gases such as nitrogen or CO₂. Mixtures of the foregoing may also be used. Fresh inert gas may be introduced through line 13. Additional cuprous chloride may be introduced through line 16.

Figure 2:
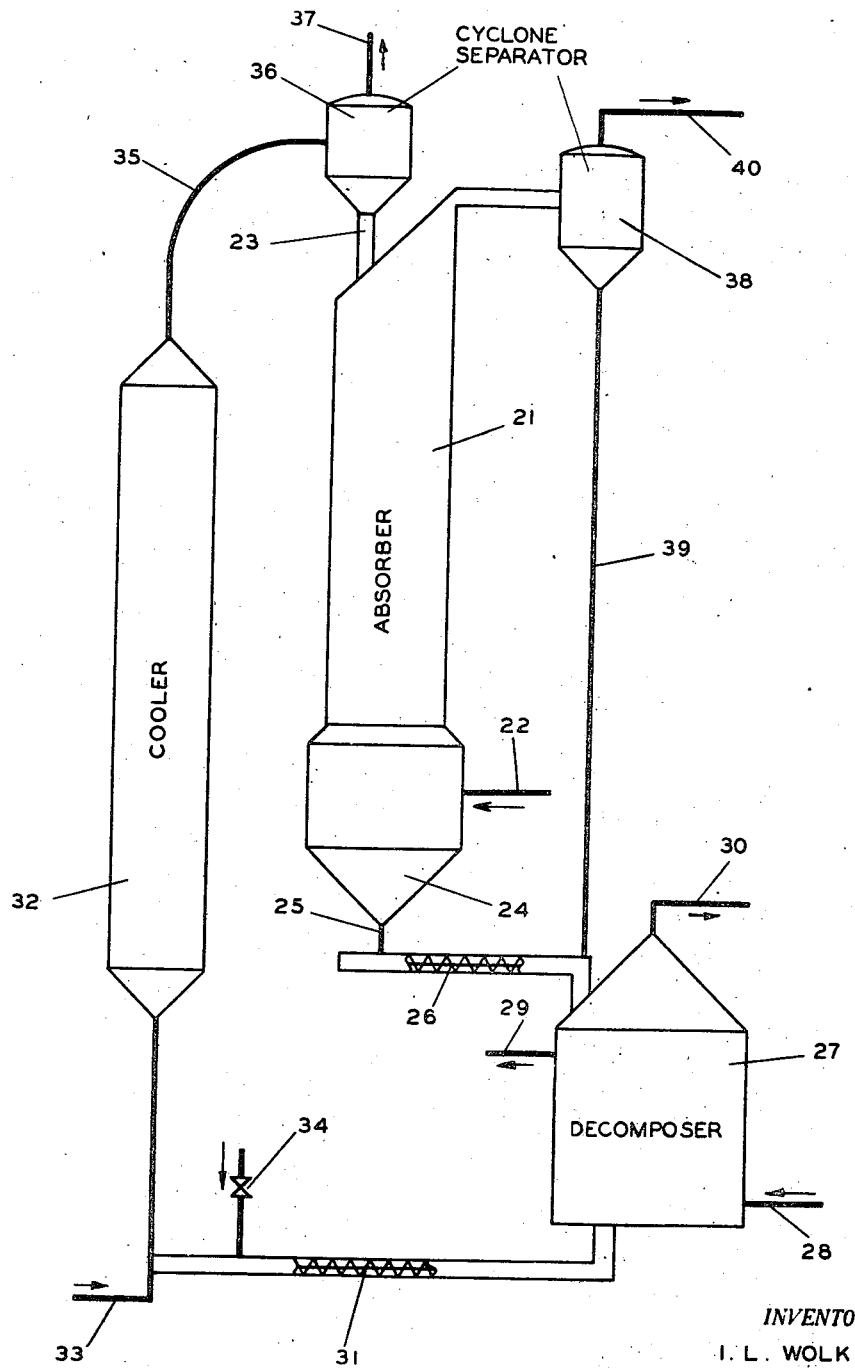

A modified process and apparatus is shown in Figure 2. Butadiene-containing gas is introduced into absorber 21 through inlet 22, at the same time finely divided cuprous chloride of say 100–200 mesh is introduced at the top of the absorber through conduit 23. The hydrocarbon flows upward and the velocity of the gas stream and the particle size of the cuprous chloride are correlated so that a desired contact time is established and at least the major portion of the complex formed drops into hopper 24. Working with reagent of uniform particle size, the velocity of flow may be such that the reagent particle remains suspended in the gas stream until its mass has increased due to reaction with butadiene to a point which will enable it to drop to the bottom. Velocities somewhat lower than those described in connection with the modification of Figure 1 may be utilized in order to permit differential separation of complex at the bottom of the reaction zone. With a reagent size of about 200 mesh, a gas velocity of 1–2 feet per second will permit settling of a substantial proportion of the complex. This will enable substantially continuous separation of completely reacted reagent at the bottom of the absorber where it is withdrawn through line 25 and conveyor 26 into heater 27 through which hot furnace gases or steam are introduced by line 28 and removed by line 29 in indirect heat exchange at a rate sufficient to increase the temperature of the complex to about 200° F. at which temperature decomposition takes place. Butadiene liberated is removed through line 30. The regenerated cuprous chloride is continuously removed by conveyor 31 and introduced into cooling tower 32. One mode of cooling the hot reagent to absorption temperatures of below about 50° F. is to introduce relatively cold inert gas such as methane through 33 at a velocity sufficient to elevate the reagent particles through the cooling tower which may also be refrigerated. At the point of entry to the cooler, the reagent is at about 175° F. and contact with cold gas and passage through the cooling tower will permit cooling to below about 50° F. Fresh reagent may be introduced at 34. The cooled reagent suspended in inert gas is passed through line 35 into cyclone separator 36 and flows into the absorber through line 23 while the separated gas leaves through 37. The inert gas thus serves to transport and cool the reagent while at the same time flushing it to remove minor amounts of adsorbed hydrocarbons. The butadiene-free gas, together with any suspended reagent and/or complex which may be carried along is passed into cyclone separator 38, the solid material being deposited and introduced into heater 27 through line 39. The residual hydrocarbon is removed from the system through line 40. The apparatus may be operated so that all or almost all of the reagent and complex are removed at the bottom of the absorber or so that all or nearly all will be removed along with the residual gases at the top. In actual practice, due to variations in particle size of reagent, separation will be effected both at top and bottom.

I claim:

1. A process for the separation of butadiene from gas mixtures containing the same which comprises suspending finely divided cuprous chloride in said gas mixture at a temperature and for a period of time sufficient to permit formation of a butadiene-cuprous chloride complex, separating the solid complex thus formed from the residual gas, preheating said complex by suspending the particles thereof in a hot gas stream containing butadiene liberated from decomposed complex, separating said preheated particles from said butadiene, and decomposing said particles of complex by suspending same in a stream of hot inert gas at a temperature and for a period of time sufficient to effect decomposition thereof, separating the gas stream containing liberated butadiene and inert gas while in a heated condition from the regenerated cuprous chloride particles, contacting said gas stream with relatively cold complex particles to preheat same and lower the temperature of the gas stream, and separating the butadiene from the inert gas.

2. A process for the recovery of butadiene from a gas stream containing the same which comprises suspending finely divided cuprous chloride particles in said gas stream, flowing said stream through an absorption zone maintained at a temperature of about 35–50° F. for a period of time sufficient to permit formation of cuprous chloride-butadiene complex, separating said complex from said gas stream, suspending the separated complex in a stream of inert relatively incondensible gas heated to a temperature between about 175 and 250° F. in a desorption zone whereby butadiene is liberated from said complex, separating cuprous chloride particles from suspension in said inert gas stream containing liberated butadiene, separating butadiene from said gas stream, and returning separated cuprous chloride and inert gas to the process.

3. A process for the recovery of butadiene from a gas stream containing the same which comprises suspending finely divided cuprous chloride particles in said gas stream, flowing said stream through an absorption zone maintained at a temperature of about 35–50° F. for a period of time sufficient to permit formation of cuprous chloride-butadiene complex, separating said complex from said gas stream, suspending the separated complex in a stream of inert relatively incondensible gas heated to a temperature of about 175–250° F. in a desorption zone whereby butadiene is liberated from said complex, separating cuprous chloride particles from suspension in said inert gas stream containing liberated butadiene, contacting said inert gas stream containing liberated butadiene with relatively cold complex separated from said absorption zone and thereby preheating said cold complex and cooling said inert gas stream containing liberated butadiene, separating said cooled inert gas containing butadiene from the preheated complex, separating butadiene from said cooled inert gas stream containing the same, and returning separated cuprous chloride and inert gas to the process.

4. A process for the separation of conjugated diolefins from gas mixtures containing the same which comprises suspending finely divided cuprous halide particles in said gas mixture at a temperature and for a period of time sufficient to permit formation of a diolefin-cuprous halide complex, separating the solid complex particles thus formed from the residual gas, decomposing said particles of complex by suspending same in a stream of hot inert gas at a temperature and for a period of time sufficient to effect decomposition thereof and liberation of the diolefin, separating the gas stream containing liberated diolefin and inert gas from the regenerated cuprous halide particles, and separating the diolefin from the inert gas.

I. LOUIS WOLK.